United States Patent
Tsujimoto

(10) Patent No.: US 10,808,108 B2
(45) Date of Patent: Oct. 20, 2020

(54) ULTRA-HIGH MOLECULAR WEIGHT POLYETHYLENE POWDER AND ULTRA-HIGH MOLECULAR WEIGHT POLYETHYLENE FIBER

(71) Applicant: Asahi Kasei Kabushiki Kaisha, Tokyo (JP)

(72) Inventor: Koichi Tsujimoto, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 169 days.

(21) Appl. No.: 16/215,765

(22) Filed: Dec. 11, 2018

(65) Prior Publication Data

US 2019/0194431 A1    Jun. 27, 2019

(30) Foreign Application Priority Data

Dec. 14, 2017   (JP) ................. 2017-239465

(51) Int. Cl.
| | |
|---|---|
| C08L 23/06 | (2006.01) |
| C08L 23/08 | (2006.01) |
| C08J 3/00 | (2006.01) |
| C08J 3/20 | (2006.01) |
| D01F 6/04 | (2006.01) |
| D01F 6/30 | (2006.01) |
| C08L 91/06 | (2006.01) |
| C08F 10/02 | (2006.01) |

(52) U.S. Cl.
CPC .............. *C08L 23/06* (2013.01); *C08F 10/02* (2013.01); *C08J 3/005* (2013.01); *C08J 3/203* (2013.01); *C08L 23/0815* (2013.01); *C08L 91/06* (2013.01); *D01F 6/04* (2013.01); *D01F 6/30* (2013.01); *C08J 2323/06* (2013.01); *C08J 2491/08* (2013.01); *C08L 2203/12* (2013.01); *C08L 2207/068* (2013.01)

(58) Field of Classification Search
CPC ................................. C08L 2207/068
See application file for complete search history.

(56) References Cited

U.S. PATENT DOCUMENTS

| | | | | |
|---|---|---|---|---|
| 5,079,287 | A * | 1/1992 | Takeshi ................ | C08L 23/06 524/528 |
| 2003/0203203 | A1* | 10/2003 | Ohta ...................... | D01F 6/04 428/394 |
| 2015/0225555 | A1* | 8/2015 | Mather ............... | C08L 23/0815 525/240 |
| 2015/0299903 | A1* | 10/2015 | Tanaka ................ | C08F 110/02 442/1 |

FOREIGN PATENT DOCUMENTS

| | | |
|---|---|---|
| JP | 2010-235926 A | 10/2010 |
| JP | 2014118535 A * | 6/2014 |

OTHER PUBLICATIONS

Machine Translation of JP 2014118535 A (Year: 2020).*
Machine Translation of JP 2010235926 A (Year: 2020).*
Biscoletto et al. Eur. Polym. J. vol. 33, No. 1, pp. 97-105, 1997. (Year: 1997).*

* cited by examiner

*Primary Examiner* — Michael M Dollinger
(74) *Attorney, Agent, or Firm* — Morgan, Lewis & Bockius LLP

(57) ABSTRACT

The present invention provides an ultra-high molecular weight polyethylene powder having a viscosity-average molecular weight of $10 \times 10^4$ or higher and $1000 \times 10^4$ or lower, wherein a temperature range in which a torque value reaches ½ of the maximum torque value is 150° C. or higher and 170° C. or lower in torque value measurement.

6 Claims, No Drawings

ULTRA-HIGH MOLECULAR WEIGHT POLYETHYLENE POWDER AND ULTRA-HIGH MOLECULAR WEIGHT POLYETHYLENE FIBER

TECHNICAL FIELD

The present invention relates to an ultra-high molecular weight polyethylene powder and an ultra-high molecular weight polyethylene fiber.

BACKGROUND ART

Ultra-high molecular weight polyethylene powders are excellent in impact resistance and abrasion resistance and are therefore used as engineering plastics in various fields. Also, the ultra-high molecular weight polyethylene powders have a much higher molecular weight than that of general-purpose polyethylene powders and are therefore expected to produce a molded product having high strength and high elasticity if the ultra-high molecular weight polyethylene powders can be highly oriented. Thus, various studies have been made on higher orientation thereof.

Particularly, Patent Literature 1 discloses a technique of a so-called "gel spinning method", which involves dissolving an ultra-high molecular weight polyethylene powder in a solvent and drawing the obtained fiber in a gel form at a high ratio.

CITATION LIST

Patent Literature

Patent Literature 1: Japanese Unexamined Patent Application Publication No. 2010-235926

SUMMARY OF INVENTION

Technical Problem

The high-strength polyethylene fiber obtained by the "gel spinning method" is known to have very high strength and modulus of elasticity as an organic fiber and further have much better impact resistance, and its application is expanding in various uses. However, for the gel spinning method, reduction in fiber strength and change in color tone caused by degradation are perceived as problems due to processing by use of a large amount of a solvent and by the application of high heat.

The present invention has been made in light of these problems, and an object of the present invention is to provide an ultra-high molecular weight polyethylene powder that can suppress reduction in fiber strength and change in color tone caused by degradation.

Solution to Problem

The present inventor has conducted diligent studies to attain the object and consequently completed the present invention by finding that a predetermined ultra-high molecular weight polyethylene powder can attain the object.

Specifically, the present invention is as follows:

[1] An ultra-high molecular weight polyethylene powder having a viscosity-average molecular weight of $10 \times 10^4$ or higher and $1000 \times 10^4$ or lower, wherein a temperature range in which a torque value reaches ½ of the maximum torque value is 150° C. or higher and 170° C. or lower in torque value measurement under the following <kneading condition>:

<Kneading Condition>
Raw Material:
   a mixture containing 5 parts by mass of the ultra-high molecular weight polyethylene powder and 95 parts by mass of liquid paraffin based on 100 parts by mass in total of the ultra-high molecular weight polyethylene powder and the liquid paraffin,
Torque Value Measurement Condition:
   the raw material is kneaded at 130° C. for 30 minutes and then further kneaded at 240° C. for 15 minutes;
   a heating rate from 130° C. to 240° C. is set to 22° C./min;
   a rotation number of a screw is set to 50 rpm; and
   the measurement is performed under a nitrogen atmosphere.

[2] The ultra-high molecular weight polyethylene powder according to [1], wherein the ultra-high molecular weight polyethylene powder has
   D10/D50 of 0.40 or more,
   D90/D50 of 2.0 or less, and
   D50 of 80 μm or larger and 250 μm or smaller.

[3] The ultra-high molecular weight polyethylene powder according to [1] or [2], wherein a content of an ultra-high molecular weight polyethylene powder particle of 53 μm or smaller is 5% by mass or more and 45% by mass or less.

[4] The ultra-high molecular weight polyethylene powder according to any of [1] to [3], wherein the ultra-high molecular weight polyethylene powder has Tm1 of 130° C. or higher and 150° C. or lower in DSC measurement.

[5] The ultra-high molecular weight polyethylene powder according to any of [1] to [4], wherein the amount of Si remaining in the ultra-high molecular weight polyethylene powder is 1 ppm or more.

[6] An ultra-high molecular weight polyethylene fiber prepared by spinning an ultra-high molecular weight polyethylene powder according to any of [1] to [5].

Advantageous Effects of Invention

The present invention provides an ultra-high molecular weight polyethylene powder that can suppress reduction in fiber strength and change in color tone caused by degradation.

DESCRIPTION OF EMBODIMENTS

Hereinafter, a mode for carrying out the present invention (hereinafter, simply referred to as the "present embodiment") will be described in detail. However, the present invention is not intended to by limited thereby. Various changes or modifications can be made in the present invention without departing from the spirit thereof.

[Ultra-High Molecular Weight Polyethylene Powder]

The ultra-high molecular weight polyethylene powder of the present embodiment has a viscosity-average molecular weight of $10 \times 10^4$ or higher and $1000 \times 10^4$ or lower.

When the ultra-high molecular weight polyethylene powder is used as a raw material for an ultra-high molecular weight polyethylene fiber, the viscosity-average molecular weight is preferably in the range of $100 \times 10^4$ or higher and $950 \times 10^4$ or lower, more preferably in the range of $200 \times 10^4$ or higher and $950 \times 10^4$ or lower, from the viewpoint of moldability and final physical properties. In the present embodiment, the viscosity-average molecular weight refers to a value determined by determining an intrinsic viscosity from the specific viscosity of a polymer solution, and converting the intrinsic viscosity to a viscosity-average molecular weight.

The ultra-high molecular weight polyethylene powder of the present embodiment is preferably a powder consisting of an ethylene homopolymer and/or a copolymer of ethylene and an olefin (hereinafter, referred to as a comonomer) copolymerizable therewith.

Specific examples of the comonomer include, but are not particularly limited to, at least one comonomer selected from the group consisting of α-olefins having 3 to 15 carbon atoms, cyclic olefins having 3 to 15 carbon atoms, compounds represented by the formula $CH_2=CHR^1$ (wherein $R^1$ is an aryl group having 6 to 12 carbon atoms), and linear, branched, or cyclic dienes having 3 to 15 carbon atoms. Among them, an α-olefin having 3 to 15 carbon atoms is preferred.

Examples of the α-olefin include, but are not particularly limited to, propylene, 1-butene, 4-methyl-1-pentene, 1-hexene, 1-octene, 1-nonene, 1-decene, 1-undecene, 1-dodecene, 1-tridecene, and 1-tetradecene.

When the ethylene polymer of the present embodiment comprises a comonomer, the content of the comonomer unit in the ethylene polymer is preferably 0.01% by mol or more and 5% by mol or less, more preferably 0.01% by mol or more and 2% by mol or less, further preferably 0.01% by mol or more and 1% by mol or less.

[Viscosity-Average Molecular Weight]

The viscosity-average molecular weight (Mv) of the ultra-high molecular weight polyethylene powder of the present embodiment is $10\times10^4$ or higher and $1000\times10^4$ or lower, preferably $100\times10^4$ or higher and $950\times10^4$ or lower, more preferably $200\times10^4$ or higher and $950\times10^4$ or lower.

The viscosity-average molecular weight (Mv) of $10\times10^4$ or higher further improves strength. Also, the viscosity-average molecular weight (Mv) of $1000\times10^4$ or lower further improves moldability. Furthermore, the viscosity-average molecular weight of $10\times10^4$ or higher and $1000\times10^4$ or lower offers better productivity and can suppress reduction in strength caused by molding.

The method for controlling the viscosity-average molecular weight (Mv) to the range mentioned above involves, for example, changing the polymerization temperature of a reactor where ethylene, or ethylene and a comonomer is (co)polymerized. The viscosity-average molecular weight (Mv) tends to be lower as the polymerization temperature is higher, and tends to be higher as the polymerization temperature is lower. Another method for controlling the viscosity-average molecular weight (Mv) to the range mentioned above involves appropriately changing the type of an organic metal compound for use as a promoter in the polymerization of ethylene, or ethylene and a comonomer. A further alternative method for controlling the viscosity-average molecular weight (Mv) to the range mentioned above involves adding a chain transfer agent in the polymerization of ethylene, or ethylene and a comonomer. The addition of the chain transfer agent tends to decrease the viscosity-average molecular weight of the ultra-high molecular weight polyethylene powder to be produced even at the same polymerization temperature.

[Temperature Range in which Torque Value Reaches ½ of Maximum Torque Value]

Indexes under static conditions, such as density and melting point, are known as conventional physical property values known in the art attributed to the crystallinity of polyethylene powders. It is further known that molecular weight distribution, etc. also influences a crystal form in the course of drawing. However, it is very difficult to properly determine, by use of the indexes mentioned above, the molding processability of an ultra-high molecular weight polyethylene powder, which is much less likely to be softened as compared with general polyethylene powders.

Meanwhile, the addition of a plasticizer permits kneading itself of even an ultra-high molecular weight polyethylene powder, which is difficult to melt-knead alone due to its very high melt viscosity.

The present inventor has focused on the effect of a plasticizer from the viewpoint of a determination method, and determined the influence of crystallinity under dynamic conditions by using a kneading torque in the course of gel formation as an index in order to more conveniently and clearly determine physical properties preferred as a raw material for a drawn molded article.

As a result, the present inventor has found that an ultra-high molecular weight polyethylene powder is surprisingly preferred as a raw material for a drawn molded article, wherein a temperature range in which a torque value reaches ½ of the maximum torque value is 150° C. or higher and 170° C. or lower in the kneading of a mixture containing 95 parts by mass of a plasticizer liquid paraffin and 5 parts by mass of the ultra-high molecular weight polyethylene powder using Labo Plastomill Mixer (unit model: 30C150, mixer model: R-60) manufactured by Toyo Seiki Seisaku-sho, Ltd. under the following <kneading condition>.

<Kneading Condition>

Raw Material:

a mixture containing 5 parts by mass of the ultra-high molecular weight polyethylene powder and 95 parts by mass of liquid paraffin based on 100 parts by mass in total of the ultra-high molecular weight polyethylene powder and the liquid paraffin, Torque Value Measurement Condition:

the raw material is kneaded at 130° C. for 30 minutes and then further kneaded at 240° C. for 15 minutes;

a heating rate from 130° C. to 240° C. is set to 22° C./min;

a rotation number of a screw is set to 50 rpm; and the measurement is performed under a nitrogen atmosphere.

In the present embodiment, the liquid paraffin can be liquid paraffin that plays a role as a plasticizer and is capable of forming a homogeneous solution at a temperature equal to or higher than the melting point of the ultra-high molecular weight polyethylene powder when kneaded with the ultra-high molecular weight polyethylene powder. The liquid paraffin is the purest hydrocarbon (oil) purified into a high purity by removing, with sulfuric anhydride and/or fuming sulfuric acid, impurities such as an aromatic hydrocarbon and/or a sulfur compound contained in a lubricating oil distillate of petroleum. Also, the liquid paraffin is clear, colorless, bland and innocuous. Examples thereof include white oil and mineral oil.

A nonvolatile solvent other than liquid paraffin may be used as a plasticizer for the purpose of determining the solubility and fusion properties of the ultra-high molecular weight polyethylene powder. Examples of the nonvolatile solvent other than liquid paraffin include: hydrocarbons such as paraffin wax; esters such as dioctyl phthalate and dibutyl phthalate; and higher alcohols such as oleyl alcohol and stearyl alcohol.

In the present embodiment, the maximum torque is the largest value of rotational load that occurs when a mixture containing the ultra-high molecular weight polyethylene powder and liquid paraffin is kneaded.

In the present embodiment, the mixture of the ultra-high molecular weight polyethylene powder and the liquid paraffin is preferably in a slurry state by premixing before the start of kneading.

When the ultra-high molecular weight polyethylene powder of the present embodiment is kneaded under the <kneading condition> mentioned above, the temperature range in which a torque value reaches ½ of the maximum torque value is 150° C. or higher and 170° C. or lower, preferably 150° C. or higher and 165° C. or lower, more preferably 150° C. or higher and 160° C. or lower.

The powder having a temperature range of 150° C. or higher in which a torque value reaches ½ of the maximum torque value in torque value measurement under the <kneading condition> can be completely dissolved and can produce a homogeneous kneaded gel. Furthermore, the powder is highly dispersible even when additionally supplemented with a filler and/or an additive or the like, and can reduce variations in the physical properties of a processed product (fiber, etc.), because the kneading torque rises rapidly.

On the other hand, the powder having a temperature range of 170° C. or lower in which a torque value reaches ½ of the maximum torque value is swollen (i.e., the state where the powder is sufficiently impregnated with liquid paraffin) at a relatively low temperature and early after the start of kneading. Therefore, a molecular chain can be disentangled at a low temperature, and a homogeneous kneaded gel (gel without the fusion of powder particles) can be obtained. As a result, a spun thread can be wound at a high speed. When the fiber is wound using a pulley or the like, the cross-sectional shape of the fiber is close to a perfect circle. Therefore, a bundle of several hundreds to several thousands of fiber filaments has a high packing rate and can produce a product having high breaking strength, though the bundle has a small fiber diameter. Furthermore, the sufficient disentanglement of the molecular chain suppresses shear heat generation during kneading and can prevent decrease in molecular weight caused by pyrolysis. Therefore, a white fiber can be obtained without change in color tone into yellow color caused by pyrolysis.

However, a general ultra-high molecular weight polyethylene powder, which has a temperature range of 200° C. or higher in which a torque value reaches ½ of the maximum torque value, is melted before being sufficiently swollen and tends to form an inhomogeneous kneaded gel having an entangled molecular chain due to the fusion of powder particles. As a result, neps occur due to the fusion of powder particles on the surface of a spun thread. When the fiber is wound using a pulley or the like, the cross-sectional shape of the fiber is ellipsoidal. Therefore, a bundle of several hundreds to several thousands of fiber filaments has a low packing rate. In addition, the entangled molecular chain disables wounding of the spun thread at a high speed so that the thread is broken in the course of winding. Furthermore, since the molecular chain cannot be disentangled, shear heat generation during kneading cannot be suppressed. Pyrolysis decreases a molecular weight and changes a color tone to obtain a yellow fiber. The molecular weight of the fiber is generally decreased by approximately 20 to 30% with respect to the molecular weight of the unkneaded powder due to pyrolysis.

In order to overcome such a situation, a powder may be kneaded at a high temperature of 270° C. or higher in terms of peak temperature. This is based on the concept that the high-temperature treatment enhances the mobility of a molecular chain and disentangles the molecular weight, and further prevents the occurrence of neps by solving the fusion of powder particles. However, the powder thus kneaded at a high temperature has a decreased molecular weight due to pyrolysis and is likely to produce a yellow fiber with a changed color tone. Also, the high-temperature processing requires time for solidifying a gel and increasing its viscosity. Therefore, in the case of wounding at a high speed, the gel is drawn before being solidified, resulting in too thin a fiber diameter. When the fiber is wound using a pulley or the like, the cross-sectional shape of the fiber is close to ellipsoid. Therefore, a bundle of several hundreds to several thousands of fiber filaments has a low packing rate. As a result, breaking strength might not be much high in spite of a large fiber diameter of the bundle. The flattening of a general fiber is 0.6 or more and less than 0.8.

The ultra-high molecular weight polyethylene powder of the present embodiment can be obtained by, for example, a production method mentioned later. For the method for producing the ultra-high molecular weight polyethylene powder of the present embodiment, specifically, it is important to adjust a particle size distribution to a bimodal distribution by blending (a) a carrier having an average particle size D50 of 1 μm or larger and 10 μm or smaller and (b) a carrier having an average particle size D50 of 20 μm or larger and 30 μm or smaller as silica carriers for use in a catalyst.

It is preferred to adjust the ratio between the carriers (a) and (b) in the system to 50% each of the carriers (a) and (b).

In the method for producing the ultra-high molecular weight polyethylene powder of the present embodiment, cooling is performed using jacket cooling and internal coil cooling in combination. The jacket cooling employs water, and the internal coil cooling employs a refrigerant (ethylene glycol:water=1:1). It is preferred to adjust the jacket cooling inlet temperature of water to 10° C. or higher and 30° C. or lower, the outlet temperature of water to 40° C. or lower, the internal coil cooling inlet temperature of the refrigerant to 0° C. or higher and 10° C. or lower, and the outlet temperature of the refrigerant to 40° C. or lower.

In the present embodiment, the torque value can be measured under the <kneading condition> mentioned above. Specifically, the measurement under the <kneading condition> is performed by the following method.

First, liquid paraffin and the ultra-high molecular weight polyethylene powder are kneaded at composition of 95 parts by mass and 5 parts by mass, respectively, based on 100 parts by mass in total of the ultra-high molecular weight polyethylene powder and the liquid paraffin. For preventing the oxidation of the ultra-high molecular weight polyethylene powder, it is preferred to add an antioxidant to the mixture of the ultra-high molecular weight polyethylene powder of the present embodiment and the liquid paraffin.

The amount of the antioxidant added is preferably 0.1 parts by mass or higher and 5.0 parts by mass or lower, more preferably 0.3 parts by mass or higher and 3.0 parts by mass or lower, further preferably 0.5 parts by mass or higher and 1.5 parts by mass or lower, based on 100 parts by mass in total of the ultra-high molecular weight polyethylene powder of the present embodiment and the liquid paraffin.

The atmosphere in the system can be set to the nitrogen atmosphere to thereby suppress the generation of oxygen radicals and the decomposition of the ultra-high molecular weight polyethylene powder ascribable to oxidative degradation.

The raw material for use in the torque value measurement is preferably a mixture consisting of 5 parts by mass of the ultra-high molecular weight polyethylene powder, 95 parts by mass of the liquid paraffin, and 0.1 parts by mass or more and 5.0 parts by mass or less of the antioxidant.

The ultra-high molecular weight polyethylene powder of the present embodiment, the liquid paraffin, and an additive are mixed by mixing these components in a poly-cup, then charging therewith Labo Plastomill Mixer (unit model: 30C150, mixer model: R-60) manufactured by Toyo Seiki Seisaku-sho, Ltd., kneading the mixture at 130° C. for 30 minutes, subsequently kneading the mixture under heating to 240° C. at a rate of 22° C./min, and further kneading the mixture at 240° C. for 15 minutes. The rotation number is 50 rpm for all the procedures. The maximum torque value and a resin temperature that exhibits the maximum torque value are read from change in average torque calculated using Labo Plastomill Mixer Test Program Ver. 4.52 (Copyright©, Toyo Seiki Seisaku-sho, Ltd.) to confirm whether or not the resin temperature falls within the temperature range of 150° C. or higher and 170° C. or lower in which a torque value reaches ½ of the maximum torque value.

[Powder Shape]

The shape of the ultra-high molecular weight polyethylene powder of the present embodiment is not particularly limited and may be a spherical shape or an amorphous shape. The ultra-high molecular weight polyethylene powder of the present embodiment may consist of primary particles, may be secondary particles composed of a plurality of primary particles aggregated and unified, or may a have a pulverized shape of secondary particles.

[Average Particle Size (D50)]

The average particle size of the ultra-high molecular weight polyethylene powder of the present embodiment is a particle size at which a cumulative weight is 50% (D50), i.e., a median size. The average particle size of the ultra-high molecular weight polyethylene powder of the present embodiment is not particularly limited and is in the range of preferably 80 μm or larger and 250 μm or smaller, more preferably 100 μm or larger and 200 μm or smaller, further preferably 110 μm or larger and 180 μm or smaller, because of excellent homogeneity of a molded article and easy handling.

[D10/D50 Ratio and D90/D50 Ratio]

When particle sizes corresponding to cumulative 10%, and cumulative 50%, and cumulative 90% from the minor diameter side of a cumulative particle size distribution are defined as D10, D50, and D90, respectively, the ultra-high molecular weight polyethylene powder of the present embodiment preferably has a D10/D50 ratio of 0.40 or more and a D90/D50 ratio of 2.0 or less.

The upper limit of the D10/D50 ratio is preferably 0.70 or less.

The lower limit of the D90/D50 ratio is preferably 1.0 or more.

The D10/D50 ratio and the D90/D50 ratio can be controlled by the particle size and particle size distribution of the ultra-high molecular weight polyethylene powder.

The particle size of the ultra-high molecular weight polyethylene powder can be adjusted by controlling the size and/or amount of a catalyst carrier for use in polymerization. The size of the catalyst carrier is adjusted to adjust the particle size of the produced ultra-high molecular weight polyethylene powder. Alternatively, the content on a particle size basis of the produced ultra-high molecular weight polyethylene powder can also be adjusted by polymerization using a catalyst having a mixture of catalyst carriers having various sizes.

The particle size distribution can be controlled by adjusting the size and/or amount of a catalyst carrier for use in polymerization. The size of the catalyst carrier is adjusted to adjust the particle size of the produced ultra-high molecular weight polyethylene powder. Alternatively, the content on a particle size basis of the produced ultra-high molecular weight polyethylene powder can also be adjusted by polymerization using a catalyst having a mixture of catalyst carriers having various sizes.

The ultra-high molecular weight polyethylene powder having D10/D50 within the range mentioned above, when kneaded with liquid paraffin, facilitates the disentanglement of the molecular chain because the ultra-high molecular weight polyethylene powder is sufficiently impregnated with the liquid paraffin. The resulting ultra-high molecular weight polyethylene powder is highly drawable and can produce a molded article, such as a fiber, having high breaking strength. This is probably because particles of a powder having a small particle size can be prevented from being melted and fused prior to sufficient impregnation of the powder having a small particle size in the ultra-high molecular weight polyethylene powder with the liquid paraffin, and the molecular chain can thus be sufficiently disentangled.

The ultra-high molecular weight polyethylene powder having D10/D50 within the range mentioned above, when kneaded with liquid paraffin, can immediately disentangle the molecular chain because the ultra-high molecular weight polyethylene powder is impregnated with the liquid paraffin in a short time. As a result, the molecular chain is disentangled in a short time, and a molded article, such as a fiber, having high breaking strength can be obtained.

The cumulative particle size distribution can be measured using a general laser diffraction particle size distribution measurement apparatus. The cumulative particle size distribution measurement apparatus is based on a wet process or a dry process, either of which may be used. In the wet process, methanol can be used as a dispersion medium. Also, an ultrasonic bath may be used as a dispersion apparatus. The measurement range of the cumulative particle size distribution depends on the performance of the apparatus. The cumulative particle size distribution is preferably measured in the range of 0.05 μm at the minimum to 700 μm at the maximum, more preferably in the range of 0.1 μm at the minimum to 500 μm at the maximum.

Specifically, the D10/D50 ratio, the D90/D50 ratio, and D50 can be measured by a method described in Examples.

[Content of Particle (Ultra-High Molecular Weight Polyethylene Powder) Having Particle Size of 53 μm or Smaller]

In the ultra-high molecular weight polyethylene powder of the present embodiment, the content of an ultra-high molecular weight polyethylene powder particle having a particle size of 53 μm or smaller is preferably 10% by mass or more and 40% by mass or less, more preferably 10% by mass or more and 30% by mass or less, further preferably 10% by mass or more and 20% by mass or less, based on 100% by mass in total of the ultra-high molecular weight polyethylene powder.

The ultra-high molecular weight polyethylene powder having a content of 10% by mass or more and 40% by mass or less of the particle, when kneaded with liquid paraffin, facilitates the disentanglement of the molecular chain because the ultra-high molecular weight polyethylene powder is sufficiently impregnated with the liquid paraffin. The resulting ultra-high molecular weight polyethylene powder is highly drawable. As a result, a molded article, such as a fiber, having high breaking strength can be obtained. This is probably because powder particles can be prevented from being melted and fused prior to sufficient impregnation of the ultra-high molecular weight polyethylene powder with the liquid paraffin, and the molecular chain can thus be sufficiently disentangled.

The content of an ultra-high molecular weight polyethylene powder particle having a particle size of 53 μm or smaller can generally be controlled by adjusting the size and/or amount of a catalyst carrier for use in polymerization. The size of the catalyst carrier is adjusted to adjust the particle size of the produced ultra-high molecular weight polyethylene powder. Alternatively, the content on a particle size basis of the produced ultra-high molecular weight polyethylene powder can also be controlled by polymerization using a catalyst having a mixture of catalyst carriers having various sizes.

Specifically, the content of an ultra-high molecular weight polyethylene powder particle having a particle size of 53 μm or smaller can be measured by a method described in Examples.

[Density]

The density of the ultra-high molecular weight polyethylene powder of the present embodiment is preferably 910 kg/m$^3$ or larger and 960 kg/m$^3$ or smaller, more preferably 920 kg/m$^3$ or larger and 950 kg/m$^3$ or smaller.

The ultra-high molecular weight polyethylene powder having a density of 910 kg/m$^3$ or larger and 960 kg/m$^3$ or smaller tends to resist change in powder shape caused by pressure during deposition of the polyethylene powder and/or impact upon delivery, etc. and can also maintain its properties.

The density of the ultra-high molecular weight polyethylene powder can be controlled by adjusting the amount and/or molecular weight of an α-olefin in polyethylene.

The density of the ultra-high molecular weight polyethylene powder of the present embodiment is a value measured in accordance with JIS K 6892 without adding an additive such as a lubricant to the ultra-high molecular weight polyethylene powder. Specifically, the density of the ultra-high molecular weight polyethylene powder can be measured by a method described in Examples.

[Melting Point (Tm1) and Quantity of Heat of Melting (ΔH1)]

The melting point (Tm1) of the ultra-high molecular weight polyethylene powder of the present embodiment is preferably 130° C. or higher and 150° C. or lower. The melting point (Tm1) of the ultra-high molecular weight polyethylene powder of the present embodiment is measured using a differential scanning calorimeter (DSC) and is specifically a value measured using a differential scanning calorimeter Pyris 1 (trade name) manufactured by PerkinElmer, Inc.

Specifically, the melting point (Tm1) can be determined by keeping 8.4 mg of a sample at 50° C. for 1 minute, and then heating the sample to 180° C. at a rate of 10° C./min. In the present embodiment, the melting point is a temperature that exhibits the maximum peak in a melting curve on the basis of JIS K 7121.

The melting point (Tm1) can be adjusted by using a copolymer of ethylene and an additional comonomer as the ethylene polymer. Use of the copolymer of ethylene and an additional comonomer can lower the melting point as compared with an ethylene homopolymer. Alternatively, the melting point (Tm1) of an ethylene homopolymer can be adjusted by controlling the molecular weight of the ethylene polymer. The ethylene polymer having a molecular weight set to a high molecular weight can have a higher melting point than that of an ethylene polymer having a low molecular weight.

Specifically, the melting point (Tm1) can be measured by a method described in Examples.

The quantity of heat of melting (ΔH1) of the ultra-high molecular weight polyethylene powder of the present embodiment is preferably 150 J/g or more and 220 J/g or less, more preferably 155 J/g or more and 190 J/g or less. The quantity of heat of melting (ΔH1) is a value measured using a differential scanning calorimeter Pyris 1 (trade name) manufactured by PerkinElmer, Inc.

Specifically, the quantity of heat of melting (ΔH1) can be determined by keeping 8.4 mg of a sample at 50° C. for 1 minute, then heating the sample to 180° C. at a rate of 10° C./min, and dividing the total quantity of heat calculated from the whole crystal peak area in the melting curve thus obtained by the mass of the sample.

The ultra-high molecular weight polyethylene powder having a higher quantity of heat of melting (ΔH1) has a higher degree of crystallinity and is therefore more preferred for the physical properties of a drawn molded article. On the other hand, the ultra-high molecular weight polyethylene powder starts to dissolve from an amorphous moiety. Therefore, a powder having a higher degree of crystallinity is generally more difficult to mold. In the present embodiment, the degree of crystallinity means the percentage of the quantity of heat of melting (unit: J/g) of an ultra-high molecular weight polyethylene powder to the quantity of heat of melting (290.4 J/g) of completely crystalline polyethylene.

The quantity of heat of melting (ΔH1) can be adjusted by using a copolymer of ethylene and an additional comonomer as the ethylene polymer. Use of the copolymer of ethylene and an additional comonomer can lower ΔH1 as compared with an ethylene homopolymer. Alternatively, the quantity of heat of melting (ΔH1) of an ethylene homopolymer can be adjusted by controlling the molecular weight of the ethylene polymer. The ethylene polymer having a molecular weight set to a high molecular weight can have higher ΔH1 than that of an ethylene polymer having a low molecular weight.

Specifically, the quantity of heat of melting (ΔH1) can be measured by a method described in Examples.

[Si Content in Ultra-High Molecular Weight Polyethylene Powder]

The silicon (Si) content of the ultra-high molecular weight polyethylene powder of the present embodiment is preferably 1 ppm or more, more preferably 10 ppm or more, further preferably 20 ppm or more.

The upper limit of the silicon (Si) content is preferably 80 ppm or less, more preferably 40 ppm or less, further preferably less than 40 ppm.

The Si content is controlled by, for example, a method using a metallocene catalyst mentioned later in a polymerization step for the production of the ultra-high molecular weight polyethylene powder.

Specifically, the Si content can be measured by a method described in Examples.

[Method for Producing Ultra-High Molecular Weight Polyethylene Powder]

The ultra-high molecular weight polyethylene powder of the present embodiment can be produced, for example, by polymerizing ethylene alone, or ethylene and a comonomer in the presence of a catalytic component.

The catalytic component for use in the production of the ultra-high molecular weight polyethylene powder of the present embodiment is not particularly limited, and the ultra-high molecular weight polyethylene powder of the present embodiment can be produced using a general metallocene catalyst.

<Metallocene Catalyst>

A general transition metal compound is used in cases using the metallocene catalyst. Examples of these cases include a production method described in Japanese Patent No. 4868853. Such a metallocene catalyst is constituted by: two catalytic components of a) a transition metal compound having a cyclic η-binding anionic ligand and b) an activating agent capable of forming a complex that exerts catalytic activity through reaction with the transition metal compound.

The transition metal compound having a cyclic η-binding anionic ligand used in the present embodiment can be represented by, for example, following formula 1:

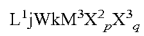

Formula 1

In formula 1, each $L^1$ independently represents a cyclic η-binding anionic ligand selected from the group consisting of a cyclopentadienyl group, an indenyl group, a tetrahydroindenyl group, a fluorenyl group, a tetrahydrofluorenyl group, and an octahydrofluorenyl group, and this ligand optionally has 1 to 8 substituents, wherein the substituents each independently represent a substituent having up to 20 non-hydrogen atoms, selected from the group consisting of hydrocarbon groups having 1 to 20 carbon atoms, halogen atoms, halogen-substituted hydrocarbon groups having 1 to 12 carbon atoms, aminohydrocarbyl groups having 1 to 12 carbon atoms, hydrocarbyloxy groups having 1 to 12 carbon atoms, dihydrocarbylamino groups having 1 to 12 carbon atoms, hydrocarbylphosphino groups having 1 to 12 carbon atoms, a silyl group, an aminosilyl group, hydrocarbyloxysilyl groups having 1 to 12 carbon atoms, and halosilyl groups.

In formula 1, $M^3$ represents a transition metal selected from transition metal groups belonging to group 4 of the periodic system, wherein the formal oxidation number is +2, +3, or +4, and this transition metal is bonded to at least one ligand $L^1$ via $\eta^5$ bond.

In formula 1, W represents a divalent substituent having up to 50 non-hydrogen atoms, and this divalent substituent monovalently binds to each of $L^1$ and $M^3$ and thereby forms a metallacycle in collaboration with $L^1$ and $M^3$. Each $X^2$ independently represents an anionic σ-binding type ligand having up to 60 non-hydrogen atoms, selected from a monovalent anionic σ-binding type ligand, a divalent anionic σ-binding type ligand divalently binding to $M^3$, and a divalent anionic σ-binding type ligand monovalently binding to each of $L^1$ and $M^3$.

In formula 1, each $X^2$ independently represents a neutral Lewis base-coordinating compound having up to 40 non-hydrogen atoms, and $X^3$ represents a neutral Lewis base-coordinating compound.

j is 1 or 2 provided that when j is 2, two ligands $L^1$ are optionally bonded to each other via a divalent group having up to 20 non-hydrogen atoms, wherein the divalent group is a group selected from the group consisting of hydrocarbadiyl groups having 1 to 20 carbon atoms, halohydrocarbadiyl groups having 1 to 12 carbon atoms, hydrocarbyleneoxy groups having 1 to 12 carbon atoms, hydrocarbyleneamino groups having 1 to 12 carbon atoms, a silanediyl group, halosilanediyl groups, and a silyleneamino group.

k is 0 or 1. p is 0, 1, or 2 provided that: when $X^2$ is a monovalent anionic σ-binding type ligand or a divalent anionic σ-binding type ligand binding to $L^1$ and $M^3$, p is an integer smaller by at least 1 than the formal oxidation number of $M^3$; and when $X^2$ is a divalent anionic σ-binding type ligand binding only to $M^3$, p is an integer smaller by at least (j+1) than the formal oxidation number of $M^3$. q is 0, 1, or 2.

Examples of the ligand $X^2$ in the compound of formula 1 include halides, hydrocarbon groups having 1 to 60 carbon atoms, hydrocarbyloxy groups having 1 to 60 carbon atoms, hydrocarbylamide groups having 1 to 60 carbon atoms, hydrocarbyl phosphide groups having 1 to 60 carbon atoms, hydrocarbyl sulfide groups having 1 to 60 carbon atoms, a silyl group, and combinations thereof.

Examples of the neutral Lewis base-coordinating compound $X^3$ in the compound of formula 1 include phosphines, ethers, amines, olefins having 2 to 40 carbon atoms, dienes having 1 to 40 carbon atoms, and divalent groups induced from these compounds.

In the present embodiment, the transition metal compound having a cyclic η-binding anionic ligand is preferably a transition metal compound represented by formula 1 wherein j=1. Preferred examples of the compound represented by formula 1 wherein j=1 include compounds represented by following formula 2:

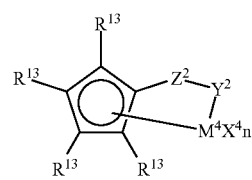

Formula 2

In formula 2, $M^4$ represents a transition metal selected from the group consisting of titanium, zirconium, nickel, and hafnium, wherein the formal oxidation number of the transition metal is +2, +3, or +4. Each $R^{13}$ independently represents a hydrogen atom or a substituent having up to 20 non-hydrogen atoms, selected from the group consisting of hydrocarbon groups having 1 to 8 carbon atoms, a silyl group, a germyl group, a cyano group, halogen atoms, and combinations thereof provided that when the substituent $R^{13}$ is a hydrocarbon group having 1 to 8 carbon atoms, a silyl group, or a germyl group, two adjacent substituents $R^{13}$ are optionally bonded to each other to form a divalent group, which can form a ring in collaboration with the bond between two carbon atoms of the cyclopentadienyl ring bonded to these two adjacent substituents $R^{13}$, respectively.

In formula 2, each $X^4$ independently represents a substituent having up to 20 non-hydrogen atoms, selected from the group consisting of halides, hydrocarbon groups having 1 to 20 carbon atoms, hydrocarbyloxy groups having 1 to 18 carbon atoms, hydrocarbylamino groups having 1 to 18 carbon atoms, a silyl group, hydrocarbylamide groups having 1 to 18 carbon atoms, hydrocarbyl phosphide groups having 1 to 18 carbon atoms, hydrocarbyl sulfide groups having 1 to 18 carbon atoms, and combinations thereof provided that two substituents $X^4$ can optionally form in collaboration a neutral conjugate diene having 4 to 30 carbon atoms or a divalent group.

In formula 2, $Y^2$ represents —O—, —S—, —NR*—, or —PR*— wherein R* represents a hydrogen atom, a hydrocarbon group having 1 to 12 carbon atoms, a hydrocarbyloxy group having 1 to 8 carbon atoms, a silyl group, an alkyl halide group having 1 to 8 carbon atoms, an aryl halide group having 6 to 20 carbon atoms, or a combination thereof.

In formula 2, $Z^2$ represents $SiR^*_2$, $CR^*_2$, $SiR^*_2SiR^*_2$, $CR^*_2CR^*_2$, $CR^*=CR^*$, $CR^*_2SiR^*_2$, or $GeR^*_2$ wherein $R^*$ is as defined above. n is 1, 2, or 3.

Examples of the transition metal compound having a cyclic η-binding anionic ligand used in the present embodiment include compounds as shown below. Specific examples of the zirconium compounds include, but are not particularly limited to, bis(methylcyclopentadienyl)zirconium dimethyl, bis(n-butylcyclopentadienyl)zirconium dimethyl, bis(indenyl)zirconium dimethyl, bis(1,3-dimethylcyclopentadienyl)zirconium dimethyl, (pentamethylcyclopentadienyl) (cyclopentadienyl)zirconium dimethyl, bis(cyclopentadienyl)zirconium dimethyl, bis(pentamethylcyclopentadienyl)zirconium dimethyl, bis(fluorenyl)zirconium dimethyl, ethylenebis(indenyl)zirconium dimethyl, ethylenebis(4,5,6,7-tetrahydro-1-indenyl) zirconium dimethyl, ethylenebis(4-methyl-1-indenyl) zirconium dimethyl, ethylenebis(5-methyl-1-indenyl) zirconium dimethyl, ethylenebis(6-methyl-1-indenyl) zirconium dimethyl, ethylenebis(7-methyl-1-indenyl) zirconium dimethyl, ethylenebis(5-methoxy-1-indenyl) zirconium dimethyl, ethylenebis(2,3-dimethyl-1-indenyl) zirconium dimethyl, ethylenebis(4,7-dimethyl-1-indenyl) zirconium dimethyl, ethylenebis-(4,7-dimethoxy-1-indenyl) zirconium dimethyl, methylenebis(cyclopentadienyl) zirconium dimethyl, isopropylidene(cyclopentadienyl) zirconium dimethyl, isopropylidene(cyclopentadienyl-fluorenyl)zirconium dimethyl, silylenebis(cyclopentadienyl) zirconium dimethyl, and dimethylsilylene (cyclopentadienyl)zirconium dimethyl.

Specific examples of the titanium compounds include, but are not particularly limited to, [(N-t-butylamido) (tetramethyl-$\eta^5$-cyclopentadienyl)-1,2-ethanediyl]titanium dimethyl, [(N-t-butylamido) (tetramethyl-$\eta^5$-cyclopentadienyl) dimethylsilane]titanium dimethyl, [(N-methylamido) (tetramethyl-$\eta^5$-cyclopentadienyl)dimethylsilane]titanium dimethyl, [(N-phenylamido) (tetramethyl-$\eta^5$-cyclopentadienyl)dimethylsilane]titanium dimethyl, [(N-benzylamido) (tetramethyl-$\eta^5$-cyclopentadienyl)dimethylsilane]titanium dimethyl, [(N-t-butylamido) ($\eta^5$-cyclopentadienyl)-1,2-ethanediyl]titanium dimethyl, [(N-t-butylamido) ($\eta^5$-cyclopentadienyl)dimethylsilane]titanium dimethyl, [(N-methylamido) ($\eta^5$-cyclopentadienyl)-1,2-ethanediyl]titanium dimethyl, [(N-methylamido) ($\eta^5$-cyclopentadienyl)dimethylsilane]titanium dimethyl, [(N-t-butylamido) ($\eta^5$-indenyl) dimethylsilane]titanium dimethyl, and [(N-benzylamido) ($\eta^5$-indenyl)dimethylsilane]titanium dimethyl.

Specific examples of the nickel compounds include, but are not particularly limited to, dibromobistriphenylphosphine nickel, dichlorobistriphenylphosphine nickel, dibromodiacetonitrile nickel, dibromodibenzonitrile nickel, dibromo(1,2-bisdiphenylphosphinoethane)nickel, dibromo (1,3-bisdiphenylphosphinopropane)nickel, dibromo(1,1'-diphenylbisphosphinoferrocene)nickel, dimethylbisdiphenylphosphine nickel, dimethyl(1,2-bisdiphenylphosphinoethane)nickel, methyl(1,2-bisdiphenylphosphinoethane)nickel tetrafluoroborate, (2-diphenylphosphino-1-phenylethyleneoxy)phenylpyridine nickel, dichlorobistriphenylphosphine palladium, dichlorodibenzonitrile palladium, dichlorodiacetonitrile palladium, dichloro(1,2-bisdiphenylphosphinoethane)palladium, bistriphenylphosphine palladium bistetrafluoroborate, and bis(2,2'-bipyridine)methyl iron tetrafluoroborate etherate.

Specific examples of the hafnium compounds include, but are not particularly limited to, [(N-t-butylamido) (tetramethyl-$\eta^5$-cyclopentadienyl)-1,2-ethanediyl]hafnium dimethyl, [(N-t-butylamido) (tetramethyl-$\eta^5$-cyclopentadienyl) dimethylsilane]hafnium dimethyl, [(N-methylamido) (tetramethyl-$\eta^5$-cyclopentadienyl)dimethylsilane]hafnium dimethyl, [(N-phenylamido) (tetramethyl-$\eta^5$-cyclopentadienyl)dimethylsilane]hafnium dimethyl, [(N-benzylamido) (tetramethyl-$\eta^5$-cyclopentadienyl)dimethylsilane]hafnium dimethyl, [(N-t-butylamido) ($\eta^5$-cyclopentadienyl)-1,2-ethanediyl]hafnium dimethyl, [(N-t-butylamido) ($\eta^5$-cyclopentadienyl)dimethylsilane]hafnium dimethyl, [(N-methylamido) ($\eta^5$-cyclopentadienyl)-1,2-ethanediyl]hafnium dimethyl, [(N-methylamido) ($\eta^5$-cyclopentadienyl)dimethylsilane]hafnium dimethyl, [(N-t-butylamido) ($\eta^5$-indenyl) dimethylsilane]hafnium dimethyl, and [(N-benzylamido) ($\eta^5$-indenyl)dimethylsilane]hafnium dimethyl.

Specific examples of the transition metal compound having a cyclic η-binding anionic ligand used in the present embodiment further include compounds named by the replacement of the moiety "dimethyl" (which appears at the end of the name of each compound, i.e., immediately after the moiety "zirconium" or "titanium", and corresponds to the moiety of $X^4$ in formula 2 in the name of each zirconium compound or titanium compound listed above with, for example, any of "dichloro", "dibromo", "diiodo", "diethyl", "dibutyl", "diphenyl", "dibenzyl", "2-(N,N-dimethylamino) benzyl", "2-butene-1,4-diyl", "s-trans-η4-1,4-diphenyl-1,3-butadiene", "s-trans-η4-3-methyl-1,3-pentadiene", "s-trans-η4-1,4-dibenzyl-1,3-butadiene", "s-trans-η4-2,4-hexadiene", "s-trans-η4-1,3-pentadiene", "s-trans-η4-1,4-ditolyl-1,3-butadiene", "s-trans-η4-1,4-bis(trimethylsilyl)-1,3-butadiene", "s-cis-η4-1,4-diphenyl-1,3-butadiene", "s-cis-η4-3-methyl-1,3-pentadiene", "s-cis-η4-1,4-dibenzyl-1,3-butadiene", "s-cis-η4-2,4-hexadiene", "s-cis-η4-1,3-pentadiene", "s-cis-η4-1,4-ditolyl-1,3-butadiene", and "s-cis-η4-1,4-bis(trimethylsilyl)-1,3-butadiene".

The transition metal compound having a cyclic η-binding anionic ligand used in the present embodiment can be synthesized by a method generally known in the art. In the present embodiment, these transition metal compounds may be used alone or in combination.

Next, the activating agent b) capable of forming a complex that exerts catalytic activity through reaction with the transition metal compound (hereinafter, also simply referred to as an "activating agent") used in the present embodiment will be described.

Examples of the activating agent according to the present embodiment include compounds represented by following formula 3:

$$[L^2\text{-}H]^{d+}[M^5_mQ_p]^{d-} \qquad \text{Formula 3}$$

wherein $[L^2\text{-}H]^{d+}$ represents a proton-donating Brønsted acid wherein $L^2$ represents a neutral Lewis base, and d represents an integer of 1 to 7; and $[M^5_mQ_p]^{d-}$ represents a compatible non-coordinating anion wherein $M^5$ represents a metal belonging to any of groups 5 to 15 of the periodic system, or a metalloid, each Q is independently selected from the group consisting of hydrides, halides, dihydrocarbylamide groups having 2 to 20 carbon atoms, hydrocarbyloxy groups having 1 to 30 carbon atoms, hydrocarbon groups having 1 to 30 carbon atoms, and substituted hydrocarbon groups having 1 to 40 carbon atoms wherein the number of the halide represented by Q is 1 or less, m represents an integer of 1 to 7, p represents an integer of 2 to 14, and d is as defined above provided that p−m=d.

Specific examples of the non-coordinating anion include, but are not particularly limited to, tetrakisphenyl borate, tri(p-tolyl) (phenyl) borate, tris(pentafluorophenyl) (phenyl) borate, tris(2,4-dimethylphenyl) (phenyl) borate, tris(3,5-dimethylphenyl) (phenyl) borate, tris(3,5-di-trifluoromethylphenyl) (phenyl) borate, tris(pentafluorophenyl) (cyclohexyl) borate, tris(pentafluorophenyl) (naphthyl) borate, tetrakis(pentafluorophenyl) borate, triphenyl(hydroxyphenyl) borate, diphenyl-di(hydroxyphenyl) borate, triphenyl(2,4-dihydroxyphenyl) borate, tri(p-tolyl) (hydroxyphenyl) borate, tris(pentafluorophenyl) (hydroxyphenyl) borate, tris(2,4-dimethylphenyl) (hydroxyphenyl) borate, tris(3,5-dimethylphenyl) (hydroxyphenyl) borate, tris(3,5-di-trifluoromethylphenyl) (hydroxyphenyl) borate, tris (pentafluorophenyl) (2-hydroxyethyl) borate, tris (pentafluorophenyl) (4-hydroxybutyl) borate, tris (pentafluorophenyl) (4-hydroxy-cyclohexyl) borate, tris (pentafluorophenyl) (4-(4'-hydroxyphenyl)phenyl) borate, and tris(pentafluorophenyl) (6-hydroxy-2-naphthyl) borate.

Other preferred examples of the non-coordinating anion include borates derived from the borates listed above by the replacement of the hydroxy group with a NHR group wherein R is preferably a methyl group, an ethyl group, or a tert-butyl group.

Specific examples of the proton-donating Bronsted acid include, but are not particularly limited to: trialkyl group-substituted ammonium cations such as triethylammonium, tripropylammonium, tri(n-butyl)ammonium, trimethylammonium, tributylammonium, and tri(n-octyl)ammonium; N,N-dialkylanilinium cations such as N,N-dimethylanilinium, N,N-diethylanilinium, N,N-2,4,6-pentamethylanilinium, and N,N-dimethylbenzylanilinium; dialkylammonium cations such as di-(i-propyl)ammonium and dicyclohexylammonium; triarylphosphonium cations such as triphenylphosphonium, tri(methylphenyl)phosphonium, and tri(dimethylphenyl)phosphonium; and dimethylsulfonium, diethylsulfonium, and diphenylsulfonium.

In the present embodiment, an organic metal oxy compound having unit represented by following formula 4 may be used as the activating agent:

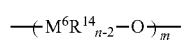

Formula 4 wherein $M^6$ represents a metal belonging to any of groups 13 to 15 of the periodic system, or a metalloid, each $R^{14}$ independently represents a hydrocarbon group having 1 to 12 carbon atoms or a substituted hydrocarbon group, n represents the valence of the metal $M^6$, and m represents an integer of 2 or larger.

As a preferred example, the activating agent of the present embodiment is, for example, an organic aluminum oxy compound comprising a unit represented by following formula 5:

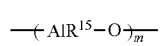

Formula 5 wherein $R^{15}$ represents an alkyl group having 1 to 8 carbon atoms, and m represents an integer of 2 to 60.

As a more preferred example, the activating agent of the present embodiment is, for example, a methylaluminoxane comprising a unit represented by following formula 6:

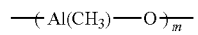

Formula 6 wherein m represents an integer of 2 to 60.

In the present embodiment, these activating agent components may be used alone or in combination.

In the present embodiment, such a catalytic component may be used as a supported catalyst in which the component is supported by a solid component. Such a solid component is not particularly limited and is specifically, for example, at least one inorganic solid material selected from: porous polymer materials such as polyethylene, polypropylene, and styrene-divinylbenzene copolymers; inorganic solid materials having an element belonging to any of groups 2, 3, 4, 13, and 14 of the periodic system, such as silica, alumina, magnesia, magnesium chloride, zirconia, titania, boron oxide, calcium oxide, zinc oxide, barium oxide, vanadium pentaoxide, chromium oxide, and thorium oxide, and mixtures thereof; and complex oxides thereof.

Specific examples of the complex oxides of silica include, but are not particularly limited to, complex oxides of silica and an element of group 2 or 13 of the periodic system, such as silica-magnesia and silica-alumina. In the present embodiment, in addition to the two catalytic components mentioned above, an organic aluminum compound can be used, if necessary, as a catalytic component. The organic aluminum compound that can be used in the present embodiment is, for example, a compound represented by following formula 7:

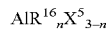

Formula 7 wherein $R^{16}$ represents an alkyl group having 1 to 12 carbon atoms or an aryl group having 6 to 20 carbon atoms, $X^5$ represents halogen, hydrogen, or an alkoxyl group, wherein the alkyl group is linear, branched, or cyclic, and n represents an integer of 1 to 3.

It is preferred to adjust a particle size distribution to a bimodal distribution by blending (a) a silica carrier having an average particle size D50 of 1 μm or larger and 10 μm or smaller and (b) a silica carrier having an average particle size D50 of 20 μm or larger and 30 μm or smaller. In this respect, it is preferred to mix 50% each of the carriers (a) and (b). Such adjustment can adjust the D10/D50 ratio, the D90/D50 ratio, and the content of a particle (ultra-high molecular weight polyethylene powder) having a particle size of 53 μm or smaller as mentioned above to the predetermined values. Also, the temperature range in which a torque value reaches ½ of the maximum torque value as mentioned above can be set to 150° C. or higher and 170° C. or lower.

The Si content of the ultra-high molecular weight polyethylene powder of the present embodiment is preferably 1.0 ppm or more. The ultra-high molecular weight polyethylene powder having a Si content of 1.0 ppm or more has better thermal stability and can yield a fiber having better long-term stability. Furthermore, the reaction with an antioxidant and/or a thermal stabilizer added during processing can be suppressed. Thus, the resulting fiber tends to be able to be prevented from being colored due to the formation of an organic metal complex.

In this context, the organic aluminum compound may be a mixture of compounds represented by formula 7. In the organic aluminum compound that can be used in the present embodiment, examples of $R^{16}$ in the formula include a methyl group, an ethyl group, a butyl group, an isobutyl group, a hexyl group, an octyl group, a decyl group, a phenyl group, and a tolyl group. Examples of $X^5$ in the formula include a methoxy group, an ethoxy group, a butoxy group, and chloro.

Specific examples of the organic aluminum compound that can be used in the present embodiment include, but are not particularly limited to, trimethyl aluminum, triethyl aluminum, tributyl aluminum, triisobutyl aluminum, trihexyl aluminum, trioctyl aluminum, tridecyl aluminum, diethyl aluminum hydride, dibutyl aluminum hydride, and diisobutyl aluminum hydride. Alternatively, a mixture thereof may be used. Alternative examples of the organic aluminum compound that can be used in the present embodiment include reaction products of these organic aluminums and alcohols such as methyl alcohol, ethyl alcohol, butyl alcohol, pentyl alcohol, hexyl alcohol, octyl alcohol, and decyl alcohol, for example, dimethyl methoxy aluminum, dimethyl ethoxy aluminum, and dibutyl butoxy aluminum.

Examples of the polymerization method for the polyethylene in the method for producing the ultra-high molecular weight polyethylene powder of the present embodiment include methods for (co)polymerizing ethylene or monomers including ethylene by a suspension polymerization or vapor-phase polymerization method. Among them, the suspension polymerization method is preferred because this method can efficiently remove polymerization heat. In the suspension polymerization method, an inert hydrocarbon vehicle can be used as a vehicle. The olefin itself can also be used as a solvent.

Specific examples of such an inert hydrocarbon vehicle can include, but are not particularly limited to: aliphatic hydrocarbons such as propane, butane, isobutane, pentane, isopentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethyl chloride, chlorobenzene, and dichloromethane; and mixtures thereof.

In the method for producing the ultra-high molecular weight polyethylene powder, the polymerization temperature is usually 30° C. or higher and 100° C. or lower. The polymerization temperature is preferably 40° C. or higher, more preferably 50° C. or higher, and preferably 95° C. or lower, more preferably 90° C. or lower. The polymerization temperature equal to or higher than 30° C. tends to realize efficient industrial production. On the other hand, the polymerization temperature equal to or lower than 100° C. tends to realize continuous stable operation.

In the method for producing the ultra-high molecular weight polyethylene powder, the polymerization pressure is usually atmospheric pressure or higher and 2 MPa or lower. The polymerization pressure is preferably 0.1 MPa or higher, more preferably 0.12 MPa or higher, and preferably 1.5 MPa or lower, more preferably 1.0 MPa or lower. The polymerization pressure equal to or higher than atmospheric pressure tends to realize more efficient industrial production. The polymerization pressure equal to or lower than 2 MPa tends to be able to suppress partial heat generation ascribable to rapid polymerization reaction during the introduction of a catalyst, and realize stable production of the ultra-high molecular weight polyethylene powder.

The polymerization reaction can be carried out by any of batch, semicontinuous, and continuous methods. Continuous polymerization is preferred. A partial high-temperature state ascribable to rapid ethylene reaction can be suppressed by continuously supplying ethylene gas, a solvent, a catalyst, etc., into the polymerization system while continuously discharging them together with produced ultra-high molecular weight polyethylene powders. Thus, the polymerization system is further stabilized. Ethylene reaction in a homogeneous state in the system prevents the formation of branches and/or double bonds or the like in polymer chains and is less likely to cause reduction in molecular weight and/or crosslinking of the ultra-high molecular weight polyethylene powder. The resulting ultra-high molecular weight polyethylene powder decreases unmelted matter remaining when melted or dissolved, is prevented from being colored, and is less likely to present problems such as reduced mechanical properties. Accordingly, the continuous method, which achieves a more homogeneous polymerization system, is preferred. Accordingly, the continuous method, which achieves a more homogeneous polymerization system, is preferred.

Alternatively, the polymerization may be carried out at two or more stages differing in reaction conditions. The intrinsic viscosity of the resulting ultra-high molecular weight polyethylene powder can also be adjusted by the presence of hydrogen in the polymerization system or by the change of the polymerization temperature, as described in, for example, the specification of West German Patent Application Publication No. 3127133. The addition of hydrogen as a chain transfer agent into the polymerization system can control the intrinsic viscosity within a proper range. In the case of adding hydrogen into the polymerization system, the mole fraction of the hydrogen is preferably 0 mol % or more and 30 mol % or less, more preferably 0 mol % or more and 25 mol % or less, further preferably 0 mol % or more and 20 mol % or less. In the present embodiment, in addition to each component as mentioned above, other components known in the art to be useful in the ultra-high molecular weight polyethylene powder production can be included.

For the polymerization for the ultra-high molecular weight polyethylene powder, an antistatic agent such as Stadis 450 manufactured by The Associated Octel Company Ltd. (agent: Maruwa Bussan K.K.) may be used for suppressing the adherence of polymers to a polymerization reactor. Stadis 450 may be diluted with an inert hydrocarbon vehicle and then added to the polymerization reactor through a pump or the like. The amount of this dilution added is preferably in the range of 0.10 ppm or higher and 20 ppm or lower, more preferably in the range of 0.20 ppm or higher and 10 ppm or lower, with respect to the amount of the ultra-high molecular weight polyethylene powder produced per unit time.

The particle size distribution is adjusted to a bimodal distribution by blending (a) a silica carrier having an average particle size D50 of 1 μm or larger and 10 μm or smaller and (b) a silica carrier having an average particle size D50 of 20 μm or larger and 30 μm or smaller as silica carriers for use in a catalyst. The ratio between the carriers (a) and (b) in the system is also adjusted to 50% each of the carriers (a) and (b). Cooling is performed using jacket cooling and internal coil cooling in combination. The jacket cooling employs water, and the internal coil cooling employs a refrigerant (ethylene glycol:water=1:1). The jacket cooling inlet temperature of water is adjusted to 10° C. or higher and 30° C. or lower. The outlet temperature of water is adjusted to 40° C. or lower. The internal coil cooling inlet temperature of the refrigerant is adjusted to 0° C. or higher and 10° C. or lower. The outlet temperature of the refrigerant is adjusted to 40° C. or lower.

The ultra-high molecular weight polyethylene powder thus obtained is separated from the solvent by centrifugation before being dried to adjust the amount of the solvent contained in the ultra-high molecular weight polyethylene powder before drying to 70% by mass or lower with respect to the weight of the ultra-high molecular weight polyethylene powder. By such adjustment, the ultra-high molecular weight polyethylene powder of the present embodiment can be obtained.

[Additive]

The ultra-high molecular weight polyethylene powder of the present embodiment can be supplemented, if necessary, with an additive such as a slip agent, a neutralizer, an antioxidant, a light stabilizer, an antistatic agent, or a pigment.

Examples of the slip agent or the neutralizer include, but are not particularly limited to, aliphatic hydrocarbons, higher fatty acids, higher fatty acid metal salts, fatty acid esters of alcohols, waxes, higher fatty acid amides, silicone oil, and rosin. The content of the slip agent or the neutralizer is not particularly limited and is 5000 ppm or lower, preferably 4000 ppm or lower, more preferably 3000 ppm or lower.

The antioxidant is not particularly limited and is preferably, for example, a phenol compound or a phenol-phosphorus compound. Specific examples include: phenol antioxidants such as 2,6-di-t-butyl-4-methylphenol (dibutylhydroxytoluene), n-octadecyl-3-(4-hydroxy-3,5-di-t-butylphenyl)propionate, and tetrakis(methylene(3,5-di-t-butyl-4-hydroxyhydrocinnamate))methane; phenol-phosphorus antioxidants such as 6-[3-(3-t-butyl-4-hydroxy-5-methylphenyl)propoxy]-2,4,8,10-tetra-t-butyldibenzo[d,f][1,3,2]dioxaphosphepin; and phosphorus antioxidants such as tetrakis(2,4-di-t-butylphenyl)-4,4'-biphenylene-di-phosphonite, tris(2,4-di-t-butylphenyl)phosphite, and cyclic neopentane tetraylbis(2,4-t-butylphenyl phosphite).

The amount of the antioxidant in the ultra-high molecular weight polyethylene powder of the present embodiment is usually 100 ppm or higher and 5000 ppm or lower, preferably 100 ppm or higher and 4000 ppm or lower, more preferably 100 ppm or higher and 3000 ppm or lower. The ultra-high molecular weight polyethylene powder containing 100 ppm or higher of the antioxidant is less susceptible to embrittlement and/or discoloration, reduction in mechanical properties, etc., because of the suppressed degradation thereof, resulting in better long-term stability. The antioxidant contained in an amount of 5000 ppm or lower can suppress coloration ascribable to the antioxidant itself or a modified form of the antioxidant or coloration caused by the reaction of the antioxidant with the metal components.

Examples of the light stabilizer include, but are not particularly limited to: benzotriazole light stabilizers such as 2-(5-methyl-2-hydroxyphenyl)benzotriazole and 2-(3-t-butyl-5-methyl-2-hydroxyphenyl)-5-chlorobenzotriazole; and hindered amine light stabilizers such as bis(2,2,6,6-tetramethyl-4-piperidine)sebacate and poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}]. The content of the light stabilizer is not particularly limited and is usually 5000 ppm or lower, preferably 3000 ppm or lower, more preferably 2000 ppm or lower.

Examples of the antistatic agent include, but are not particularly limited to, aluminosilicate, kaolin, clay, natural silica, synthetic silica, silicates, talc, diatomaceous earth, and glycerin fatty acid ester.

The content of an organic additive contained in the fiber made of the ultra-high molecular weight polyethylene powder can be determined by subjecting the fiber to extraction for 6 hours by Soxhlet extraction using tetrahydrofuran (THF), and separating the extract by liquid chromatography, followed by quantification. Also, the content of an inorganic additive can be quantified from an ash weight obtained by the combustion of the polyethylene resin in an electric furnace.

[Molded Article]

The ultra-high molecular weight polyethylene powder of the present embodiment can be processed by various methods. A molded article obtained using the ultra-high molecular weight polyethylene powder can be employed in various uses. The molded article is not limited and is suitable for, for example, a microporous membrane for secondary battery separators, particularly, a microporous membrane for lithium ion secondary battery separators, a sintered body, a fiber, or gel spinning. Examples of the method for producing the microporous membrane include a processing method based on a wet process using a solvent, which involves extrusion in an extruder equipped with a T die, drawing, extraction, and drying.

The molded article can also be used as a molded article obtained by sintering the ethylene polymer, a filter, and a dust collector, etc. by exploiting excellent features such as abrasion resistance, high slidability, high strength, and high impact resistance, which are the properties of the high-molecular-weight ethylene polymer.

The ultra-high molecular weight polyethylene powder of the present embodiment can be spun to obtain an ultra-high molecular weight polyethylene powder fiber. Examples of the method for producing the ultra-high molecular weight polyethylene fiber include a method which involves kneading and spinning liquid paraffin and the ultra-high molecular weight polyethylene powder, followed by heating and drawing.

EXAMPLES

Hereinafter, the present invention will be described more specifically with reference to Examples and Comparative Examples. However, the present invention is not intended to be limited by Examples below by any means.

[Methods and Conditions for Measurement]

The physical properties of ultra-high molecular weight polyethylene powders of Examples and Comparative Examples were measured by the following methods.

(1) Viscosity-Average Molecular Weight (Mv)

1) 10 mg of each ultra-high molecular weight polyethylene powder was weighed and charged into a test tube.

2) 20 mL of decalin (decahydronaphthalene) was charged into the test tube.

3) The ultra-high molecular weight polyethylene powder was dissolved by stirring at 150° C. for 2 hours.

4) The falling time (ts) between gauges of the solution was measured in a thermostat bath of 135° C. using an Ubbelohde-type viscometer.

5) The falling time (ts) between gauges of 5 mg of the ultra-high molecular weight polyethylene powder was measured in the same way as above.

6) The falling time (tb) of decalin alone was measured as a blank without the addition of the ultra-high molecular weight polyethylene powder.

7) The reduced viscosity ($\eta sp/C$) of each ultra-high molecular weight polyethylene powder determined according to the expression given below was plotted to obtain a linear equation of the concentration (C) and the reduced viscosity ($\eta sp/C$) of the ultra-high molecular weight polyethylene powder. The intrinsic viscosity ($\eta$) extrapolated to the concentration 0 of the ultra-high molecular weight polyethylene powder was determined.

$$\eta sp/C = (ts/tb - 1)/0.1$$

8) The viscosity-average molecular weight (Mv) was determined from this intrinsic viscosity (η) according to the following expression.

$$Mv = (5.34 \times 10^4) \times [\eta]^{1.49}$$

(2) Density 1) 180 g of each ultra-high molecular weight polyethylene powder was charged into a die of 200 mm×200 mm×4 mm in thickness.

2) The die was preheated at 10 kg/cm² for 5 minutes in a press set to a temperature of 200° C., defoamed three times, and pressed at 150 kg/cm² for 15 minutes.

3) The die was cooled to room temperature in a cooling press.

4) A section of 2 cm×2 cm×4 mm in thickness was cut out of the obtained pressed sheet.

5) The density of the molded article was measured using a density gradient tube conforming to JIS K 7112, and the obtained value was used as the density of the powder.

(3) Average Particle Size (D50)

The average particle size of each ultra-high molecular weight polyethylene powder was measured using a laser diffraction particle size distribution measurement apparatus SALD-2300 (manufactured by Shimadzu Corp.). The dispersion medium used was methanol, and the dispersion apparatus used was an ultrasonic bath. In the cumulative particle size distribution data analyzed with this apparatus, particles in the distribution were added from the minor diameter side, and the cumulative 50% particle size of the particles was used as the average particle size (D50).

(4) D10/D50 Ratio

The particle size distribution was measured using a laser diffraction particle size distribution measurement apparatus SALD-2300 (manufactured by Shimadzu Corp.). The dispersion medium used was methanol, and the dispersion apparatus used was an ultrasonic bath. In the cumulative particle size distribution data analyzed with this apparatus, particles in the distribution were added from the minor diameter side, and the cumulative 10% and cumulative 50% particle sizes of the particles were defined as D10 and D50, respectively, to determine the D10/D50 ratio.

(5) D90/D50 Ratio

The particle size distribution was measured using a laser diffraction particle size distribution measurement apparatus SALD-2300 (manufactured by Shimadzu Corp.). The dispersion medium used was methanol, and the dispersion apparatus used was an ultrasonic bath. In the cumulative particle size distribution data analyzed with this apparatus, particles in the distribution were added from the minor diameter side, and the cumulative 50% and cumulative 90% particle sizes of the particles were defined as D50 and D90, respectively, to determine the D90/D50 ratio.

(6) Content of Particle Having Particle Size of 53 μm or Smaller

The content of a particle having a particle size of 53 μm or smaller was determined as the mass (g) of particles passing through a sieve having an aperture size of 53 μm with respect to the total mass of particles (ultra-high molecular weight polyethylene powder) in the measurement of (3) Average particle size described above.

The content (%) of the particle having a particle size of 53 μm or smaller was calculated according to the following expression from the thus-determined mass of particles passing through a sieve having an aperture size of 53 μm.

content (%) of the particle having a particle size of 53 μm or smaller=[Mass (g) of particles passing through a sieve having an aperture size of 53 μm]/[Total mass 100 (g) of particles(ultra-high molecular weight polyethylene powder)]×100

(7) Measurement of Quantity of Heat of Melting (ΔH1) and Melting Point (Tm1)

The heat of melting of each ultra-high molecular weight polyethylene powder was measured using a differential scanning calorimeter Pyris 1 (trade name) manufactured by PerkinElmer, Inc. The quantity of heat of melting (ΔH1) was determined by keeping 8.4 mg of a sample at 50° C. for 1 minute, then heating the sample to 180° C. at a rate of 10° C./min, and dividing the total quantity of heat calculated from the whole crystal peak area in the melting curve thus obtained by the mass of the sample.

The melting point (Tm1) of the ultra-high molecular weight polyethylene powder according to the present invention was a value measured using a differential scanning calorimeter Pyris 1 (trade name) manufactured by PerkinElmer, Inc. The melting point was determined by keeping 8.4 mg of a sample at 50° C. for 1 minute, and then heating the sample to 180° C. at a rate of 10° C./min.

(8) Measurement of Kneading Torque

Kneading torque measurement was performed by the following method.

Liquid paraffin and each ultra-high molecular weight polyethylene powder were kneaded at composition of 95% by mass and 5% by mass, respectively, with respect to the total mass of the liquid paraffin and the ultra-high molecular weight polyethylene powder. Specifically, 2.0 g of the ultra-high molecular weight polyethylene powder, 38.0 g of liquid paraffin (product name: Smoil P-350P) manufactured by MORESCO Corp., and 0.4 g of tetrakis[methylene(3,5-di-t-butyl-4-hydroxy-hydrocinnamate)]methane (product name: ANOX20) manufactured by Great Lakes Chemical Japan were added to a 200 ml poly-cup and well mixed. Then, Labo Plastomill Mixer (unit model: 30C150, mixer model: R-60) manufactured by Toyo Seiki Seisaku-sho, Ltd. was charged therewith, and the mixture was kneaded at 130° C. for 30 minutes, subsequently kneaded under heating to 240° C. at a rate of 22° C./min, and further kneaded at 240° C. for 15 minutes. The number of rotations was 50 rpm for all the procedures. The maximum torque value and a resin temperature that exhibited the maximum torque value were read from change in average torque calculated using Labo Plastomill Mixer Test Program Ver. 4.52 (Copyright©, Toyo Seiki Seisaku-sho, Ltd.) to confirm whether or not the resin temperature would fall within the temperature range of 150° C. or higher and 170° C. or lower in which a torque value reached ½ of the maximum torque value.

(9) Measurement of Si Content

Each ultra-high molecular weight polyethylene powder was pressure-decomposed using a microwave decomposition apparatus (model ETHOS TC, manufactured by Milestone General K.K.). The element concentration of the metal Si in the ultra-high molecular weight polyethylene powder was measured by the internal standard method using ICP-MS (inductively coupled plasma-mass spectrometer, model X Series X7, manufactured by ThermoFisher Scientific K.K.). A molded article such as a membrane or a thread may be cut, and the Si content in the molded article can also be measured by the measurement mentioned above.

In the present invention, ethylene and hexane used in Examples and Comparative Examples were dehydrated using MS-3A (manufactured by UNION SHOWA K.K.). The hexane was used after being further deoxidated by deaeration under a reduced pressure using a vacuum pump.

(Average Particle Sizes D50 of Silica Carrier Precursor and Silica Carrier)

The average particle size D50 of each silica carrier precursor or silica carrier in Examples was measured using a laser diffraction particle size distribution measurement apparatus (SALD-2100 manufactured by Shimadzu Corp.). The average particle size D50 of the silica carrier precursor was identical with the average particle size D50 of the silica carrier.

The particle size distribution was adjusted to a bimodal distribution by blending (a) a silica carrier having an average particle size D50 of 1 µm or larger and 10 µm or smaller and (b) a silica carrier having an average particle size D50 of 20 µm or larger and 30 µm or smaller. Also, the ratio between the carriers (a) and (b) in the system was adjusted to 50% each of the carriers (a) and (b).

[Evaluation Method]

(10) b Value (Preparation of Sheet for b Value Measurement)

Liquid paraffin (manufactured by MORESCO Corp.; Moresco White P-350P) (90% by mass) was added into ultra-high molecular weight polyethylene powder PE (10% by mass) supplemented with 500 ppm of n-octadecyl-3-(4-hydroxy-3,5-di-t-butylphenyl)propionate as an antioxidant to prepare a liquid in a slurry form. This liquid in a slurry form was kneaded at 190° C. and 50 rpm for 60 minutes using a batch-type melt kneading machine (manufactured by Toyo Seiki Seisaku-Sho Ltd.; LABO PLASTOMILL). The obtained kneaded product was molded at 1 MPa in a hot press of 190° C. and directly heat-treated for 3 minutes. Then, the pressure was raised to 10 MPa, and the product was further kept in this state for 3 minutes. The product was cooled at 5 MPa in a water-cooled press controlled at 25° C. to prepare a sheet having a thickness of 1 mm. This sheet was cut into 5 cm square, dipped in 100 mL of xylene, and left standing for 1 hour, followed by the removal of the supernatant xylene solution. This operation was repeated three times to completely extract the liquid paraffin from the sheet. The sheet was dried in air at room temperature for 12 hours and then dried in hot air for 3 hours using a gear oven set to 80° C. to prepare a sheet for b value measurement.

(Evaluation)

The b value was determined by measuring the sheet having a thickness of 1 mm prepared by the method mentioned above, using Spectro Photo Meter TOPSCAN TC-1800MKIII manufactured by Tokyo Denshoku Co., Ltd.

(Evaluation Criteria)

⊚ means that the b value was less than 1.5.

○ means that the b value was 1.5 or more and less than 2.0.

× means that the b value was 2.0 or more.

(11) Winding Rate

The kneaded gel obtained by kneading using Labo Plastomill Mixer (unit model: 30C150, mixer model: R-60) manufactured by Toyo Seiki Seisaku-sho, Ltd. as described in the preceding section (8) was spun using Capilograph (unit model: Capilograph 1D) manufactured by Toyo Seiki Seisaku-sho, Ltd. to obtain an undrawn thread. The spinning conditions were set to 190° C. and an extrusion rate of 10 mm/min and kept constant, and the spun thread was wound at a limit speed so as not to have too thin a fiber diameter.

(Evaluation Criteria)

⊚ means that the winding rate was 20 m/min or more.

○ means that the winding rate was 10 m/min or more and less than 20 m/min.

× means that the winding rate was less than 10 m/min.

(12) Flattening

Calculation was made using the thread obtained by the method described in the preceding section (11). The calculation method is as described below. First, the major axis was calculated. Next, the minor axis was drawn so as to pass through the center of the major axis and vertically intersecting the major axis. The minor axis was divided by the major axis to determine the flattening. A perfect circle has a flattening of 1.0.

(Evaluation Criteria)

⊚ means that the flattening was 0.8 or more and 1.0 or less.

○ means that the flattening was 0.7 or more and less than 0.8.

× means that the flattening was less than 0.7.

[Method for Synthesizing Catalyst]

Reference Example 1: Catalyst Synthesis Example 1

Preparation of Solid Catalytic Component [A]

To an 8 L stainless autoclave purged with nitrogen, 1,600 mL of hexane was added. To this autoclave, 900 mL of a hexane solution containing 1 mol/L titanium tetrachloride and 900 mL of a hexane solution containing 1 mol/L organic magnesium compound represented by the compositional formula $AlMg_5(C_4H_9)_{11}(OSiH)_2$ were added at the same time over 5 hours with stirring at 12° C. After the addition, the mixture was gradually heated, and the reaction was continued at 12° C. for 1 hour. After the completion of the reaction, 1,600 mL of the supernatant was removed, and the resulting solid was washed with 1,600 mL of hexane ten times to prepare solid catalytic component [A]. The amount of titanium contained per g of this solid catalytic component was 3.15 mmol.

Reference Example 2: Catalyst Synthesis Example 2

Preparation of Supported Metallocene Catalytic Component [B]

(1) Spherical silica having an average particle size of 4 µm, a surface area of 600 m$^2$/g, and an intra-particle pore volume of 1.6 mL/g and (2) spherical silica having an average particle size of 25 µm, a surface area of 700 m$^2$/g, and an intra-particle pore volume of 1.8 mL/g were fired at 500° C. for 6 hours in the nitrogen atmosphere for dehydration. The mixing ratio between the silica (1) and the silica (2) was adjusted to 1:1. The amount of surface hydroxy groups on the dehydrated silica was 1.82 mmol/g per $SiO_2$. In a 1.8 L autoclave, 40 g of this dehydrated silica was dispersed in 800 mL of hexane under a nitrogen atmosphere to obtain slurry. While the temperature of the obtained slurry was kept at 50° C. with stirring, 80 mL of a hexane solution of triethyl aluminum (concentration: 1 mol/L) was added thereto. Then, the mixture was stirred for 3 hours such that the triethyl aluminum was reacted with the surface hydroxy groups of the silica to obtain component [a] containing triethyl aluminum-treated silica (in which the surface hydroxy groups of the triethyl aluminum-treated silica were capped by the triethyl aluminum) and a supernatant. Then, the supernatant in the obtained reaction mixture was removed by decantation to remove unreacted triethyl aluminum in the supernatant. Then, an appropriate amount of hexane was added to the resulting silica to obtain 870 mL of hexane slurry of triethyl aluminum-treated silica.

Meanwhile, [(N-t-butylamido) (tetramethyl-$\eta^5$-cyclopentadienyl)dimethylsilane]titanium-1,3-pentadiene (hereinafter, referred to as a "titanium complex") was dissolved at 200 mmol in 1000 mL of Isopar E (trade name of hydrocarbon mixture manufactured by Exxon Chemical Co., Inc. (US)). To this solution, 20 mL of a hexane solution containing 1 mol/L compound of the formula AlMg$_6$(C$_2$H$_5$)$_3$(n-C$_4$H$_9$)$_{12}$ synthesized in advance from triethyl aluminum and dibutyl magnesium was added. The titanium complex concentration was adjusted to 0.1 mol/L by the addition of hexane to obtain component [b].

Bis(hydrogenated tallow alkyl)methylammonium-tris (pentafluorophenyl) (4-hydroxyphenyl) borate (hereinafter, referred to as a "borate") (5.7 g) was added to 50 mL of toluene and dissolved therein to obtain a 100 mmol/L toluene solution of the borate. To this toluene solution of the borate, 5 mL of a hexane solution containing 1 mol/L ethoxydiethyl aluminum was added at room temperature. The borate concentration in the solution was adjusted to 70 mmol/L by the addition of hexane. Then, the mixture was stirred at room temperature for 2 hours to obtain a reaction mixture containing the borate.

To 800 mL of the slurry of the component [a] obtained above, 46 mL of this reaction mixture containing the borate was added with stirring at 15 to 20° C. to allow the borate to be supported by the silica. In this way, slurry of the borate-supported silica was obtained. To this slurry, 32 mL of the component [b] obtained above was further added, and the mixture was stirred for 4 hours such that the titanium complex was reacted with the borate. In this way, supported metallocene catalyst [B] containing silica with a catalytic active species formed thereon, and a supernatant was obtained.

Then, the supernatant in the obtained reaction mixture was removed by decantation to remove unreacted triethyl aluminum in the supernatant.

Reference Example 3: Catalyst Synthesis Example 3

Preparation of Supported Metallocene Catalytic Component [C]

(1) Spherical silica having an average particle size of 4 µm, a surface area of 600 m$^2$/g, and an intra-particle pore volume of 1.6 mL/g was fired at 500° C. for 6 hours under a nitrogen atmosphere for dehydration. The amount of surface hydroxy groups on the dehydrated silica was 1.63 mmol/g per SiO$_2$. In a 1.8 L autoclave, 40 g of this dehydrated silica was dispersed in 800 mL of hexane under a nitrogen atmosphere to obtain slurry. While the temperature of the obtained slurry was kept at 50° C. with stirring, 80 mL of a hexane solution of triethyl aluminum (concentration: 1 mol/L) was added thereto. Then, the mixture was stirred for 3 hours such that the triethyl aluminum was reacted with the surface hydroxy groups of the silica to obtain component [c] containing triethyl aluminum-treated silica (in which the surface hydroxy groups of the triethyl aluminum-treated silica were capped by the triethyl aluminum) and a supernatant. Then, the supernatant in the obtained reaction mixture was removed by decantation to remove unreacted triethyl aluminum in the supernatant. Then, an appropriate amount of hexane was added to the resulting silica to obtain 860 mL of hexane slurry of triethyl aluminum-treated silica.

Meanwhile, [(N-t-butylamido) (tetramethyl-$\eta^5$-cyclopentadienyl)dimethylsilane]titanium-1,3-pentadiene (hereinafter, referred to as a "titanium complex") was dissolved at 200 mmol in 1000 mL of Isopar E (trade name of hydrocarbon mixture manufactured by Exxon Chemical Co., Inc. (US)). To this solution, 20 mL of a hexane solution containing 1 mol/L compound of the formula AlMg$_6$(C$_2$H$_5$)$_3$(n-C$_4$H$_9$)$_{12}$ synthesized in advance from triethyl aluminum and dibutyl magnesium was added. The titanium complex concentration was adjusted to 0.1 mol/L by the addition of hexane to obtain component [b].

Bis(hydrogenated tallow alkyl)methylammonium-tris (pentafluorophenyl) (4-hydroxyphenyl) borate (hereinafter, referred to as a "borate") (5.7 g) was added to 50 mL of toluene and dissolved therein to obtain a 100 mmol/L toluene solution of the borate. To this toluene solution of the borate, 5 mL of a hexane solution containing 1 mol/L ethoxydiethyl aluminum was added at room temperature. The borate concentration in the solution was adjusted to 70 mmol/L by the addition of hexane. Then, the mixture was stirred at room temperature for 2 hours to obtain a reaction mixture containing the borate.

To 800 mL of the slurry of the component [c] obtained above, 46 mL of this reaction mixture containing the borate was added with stirring at 15 to 20° C. to allow the borate to be supported by the silica. In this way, slurry of the borate-supported silica was obtained. To this slurry, 32 mL of the component [b] obtained above was further added, and the mixture was stirred for 4 hours such that the titanium complex was reacted with the borate. In this way, supported metallocene catalyst [C] containing silica with a catalytic active species formed thereon, and a supernatant was obtained.

Then, the supernatant in the obtained reaction mixture was removed by decantation to remove unreacted triethyl aluminum in the supernatant.

Example 1

(Polymerization Step for Ultra-High Molecular Weight Polyethylene Powder)

Hexane, ethylene, hydrogen, and the supported metallocene catalytic component [B] were continuously supplied to a vessel-type polymerization reactor equipped with a stirring apparatus. An ultra-high molecular weight polyethylene powder (ethylene homopolymer) was produced at a rate of 10 kg/hr. The hydrogen was used at 99.99% by mol or more after being purified by the contact with a molecular sieve. The supported metallocene catalytic component [B] was added, together with 10 NL/hr of the hydrogen (NL represents normal liter (volume in terms of a normal state)), from the intermediate portion between the surface of the solution in the polymerization reactor and the bottom of the reactor at a rate of 0.15 mmol/L using the hexane as a transporting solution such that the production rate was 10 kg/hr. The supported metallocene catalytic component [B] was also adjusted to 12° C. and added from the bottom of the polymerization reactor at a rate of 0.2 g/hr, while triisobutyl aluminum was adjusted to 22° C. and added from the intermediate portion of the polymerization reactor at a rate of 5 mmol/hr. The catalytic activity was 11,000 g-PE/g-supported metallocene catalytic component [B]. The polymerization temperature was kept at 75° C. using jacket cooling and internal coil cooling in combination. The jacket cooling employed water, and the internal coil cooling employed a refrigerant (ethylene glycol:water=1:1). The jacket cooling inlet temperature of water was adjusted to 15° C. The outlet temperature of water was adjusted to 38° C. The internal coil cooling inlet temperature of the refrigerant was adjusted to 5° C. The outlet temperature of the refrigerant was adjusted to 38° C. The internal humidity of the polymerization reactor was kept at 0 ppm. The hexane was adjusted to 20° C. and supplied from the bottom of the polymerization reactor at a rate of 60 L/hr. The ethylene was supplied from the bottom of the polymerization reactor to keep the polymerization pressure at 0.8 MPa. The polymer slurry was continuously discharged into a flash drum having a pressure of 0.05 MPa such that the level of the polymerization reactor was kept constant to separate unreacted ethylene. The polymer slurry was continuously sent to a centrifuge such that the level of the flash drum was kept constant to separate the polymer from the other materials such as the solvent. In this operation, the content of the materials such as the solvent contained in the ultra-high molecular weight polyethylene powder was 40% by mass with respect to the weight of the ultra-high molecular weight polyethylene powder. The separated ultra-high molecular weight polyethylene powder was dried while nitrogen was blown thereto at 100° C. In this drying step, steam was sprayed onto the powder after the polymerization to deactivate the catalyst and the promoter. The obtained ultra-high molecular weight polyethylene powder was passed through a sieve having an aperture size of 425 μm such that particles that failed to pass through the sieve were removed to obtain an ultra-high molecular weight polyethylene powder of Example 1. The physical properties of the obtained ultra-high molecular weight polyethylene powder are shown in Table 1.

Example 2

An ultra-high molecular weight polyethylene powder of Example 2 was obtained in the same way as in Example 1 except that 1-butene was introduced at 6.3 mol % with respect to ethylene from a gas phase. The physical properties of the obtained ultra-high molecular weight polyethylene powder are shown in Table 1.

Example 3

An ultra-high molecular weight polyethylene powder of Example 3 was obtained by polymerization as described in Example 1 except that the polymerization reactor was operated at a polymerization temperature of 60° C.

Example 4

An ultra-high molecular weight polyethylene powder of Example 4 was obtained by polymerization as described in Example 2 except that the polymerization reactor was operated at a polymerization temperature of 60° C.

Example 5

An ultra-high molecular weight polyethylene powder of Example 5 was obtained by polymerization as described in Example 1 except that: the jacket cooling inlet temperature of water was adjusted to 35° C.; the outlet temperature of water was adjusted to 50° C.; the internal coil cooling inlet temperature of the refrigerant was adjusted to 15° C.; and the outlet temperature of the refrigerant was adjusted to 45° C.

Comparative Example 1

Hexane, ethylene, hydrogen, and the supported metallocene catalytic component [C] were continuously supplied to a vessel-type polymerization reactor equipped with a stirring apparatus. An ultra-high molecular weight polyethylene powder (ethylene homopolymer) was produced at a rate of 10 kg/hr. The hydrogen was used at 99.99% by mol or more after being purified by the contact with a molecular sieve. The supported metallocene catalytic component [C] was added, together with 10 NL/hr of the hydrogen (NL represents normal liter (volume in terms of a normal state)), from the intermediate point between the surface of the solution in the polymerization reactor and the bottom of the reactor at a rate of 0.15 mmol/L using the hexane as a transporting solution such that the production rate was 10 kg/hr. The supported metallocene catalytic component [C] was also adjusted to 12° C. and added from the bottom of the reactor at a rate of 0.2 g/hr, while triisobutyl aluminum was adjusted to 22° C. and added from the intermediate portion of the polymerization reactor at a rate of 5 mmol/hr. The catalytic activity was 11,000 g-PE/g-supported metallocene catalytic component [C]. The polymerization temperature was kept at 75° C. by jacket cooling. The internal humidity of the polymerization reactor was kept at 0 ppm. The hexane was adjusted to 20° C. and supplied from the bottom of the polymerization reactor at a rate of 60 L/hr. The polymer slurry was continuously sent to a centrifuge such that the level of the flash drum was kept constant to separate the polymer from the other materials such as the solvent. The separated ultra-high molecular weight polyethylene powder was dried while nitrogen was blown thereto at 100° C. In this drying step, steam was sprayed onto the powder after the polymerization to deactivate the catalyst and the promoter. The obtained ultra-high molecular weight polyethylene powder was passed through a sieve having an aperture size of 425 μm such that particles that failed to pass through the sieve were removed to obtain an ultra-high molecular weight polyethylene powder of Comparative Example 1. The physical properties of the obtained ultra-high molecular weight polyethylene powder are shown in Table 1.

Comparative Example 2

An ultra-high molecular weight polyethylene powder of Comparative Example 2 was obtained in the same way as in Comparative Example 1 except that 1-butene was introduced at 6.3 mol % with respect to ethylene from a gas phase. The physical properties of the obtained ultra-high molecular weight polyethylene powder are shown in Table 1.

Comparative Example 3

An ultra-high molecular weight polyethylene powder of Comparative Example 3 was obtained in the same way as in Comparative Example 1 except that the solid catalytic component [A] was used instead of the supported metallocene catalytic component [C]. The physical properties of the obtained ultra-high molecular weight polyethylene powder are shown in Table 1.

Comparative Example 4

An ultra-high molecular weight polyethylene powder of Comparative Example 4 was obtained in the same way as in Comparative Example 2 except that the solid catalytic component [A] was used instead of the supported metallocene catalytic component [C]. The physical properties of the obtained ultra-high molecular weight polyethylene powder are shown in Table 1.

TABLE 1

| Contents | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| Polyethylene | Homo | Copoly | Homo | Copoly | Homo | Homo | Copoly | Homo | Copoly |
| Viscosity-average molecular weight ($\times 10^4$) | 350 | 360 | 900 | 910 | 350 | 350 | 360 | 350 | 360 |
| Temperature at which torque reaches ½ of maximum (° C.) | 150 | 155 | 165 | 170 | 150 | 190 | 190 | 200 | 200 |
| D10/D50 | 0.42 | 0.43 | 0.42 | 0.43 | 0.39 | 0.39 | 0.39 | 0.35 | 0.35 |
| D90/D50 | 1.8 | 1.7 | 1.8 | 1.7 | 2.1 | 2.1 | 2.1 | 2.4 | 2.4 |
| D50 (μm) | 120 | 140 | 176 | 134 | 145 | 78 | 77 | 104 | 102 |
| % of particle having particle size of 53 μm or smaller (%) | 15 | 18 | 14 | 16 | 10 | 9 | 9 | 6 | 6 |
| Tm1 (° C.) | 139 | 131 | 139 | 131 | 138 | 138 | 132 | 144 | 136 |
| ΔH1 (J/g) | 185 | 160 | 190 | 165 | 183 | 195 | 175 | 220 | 202 |
| Density (kg/m$^3$) | 928 | 921 | 927 | 922 | 926 | 925 | 922 | 927 | 923 |
| Amount of Si remaining (ppm) | 35 | 38 | 36 | 37 | 39 | 40 | 42 | 0.1 | 0.1 |
| b value (change in color tone) | ◎ | ◎ | ◎ | ◎ | ○ | ○ | ○ | ○ | ○ |
| Winding rate (high speed) | ◎ | ◎ | ◎ | ◎ | ○ | X | X | X | X |
| Flattening | ◎ | ◎ | ◎ | ◎ | ○ | X | X | X | X |

The present application is based on Japanese Patent Application No. 2017-239465 filed on Dec. 14, 2017, the contents of which are incorporated herein by reference.

INDUSTRIAL APPLICABILITY

The ultra-high molecular weight polyethylene powder of the present invention is excellent in suppressing reduction in the strength of a molded article and change in color tone caused by degradation. Specifically, the ultra-high molecular weight polyethylene powder of the present invention has industrial applicability to uses including: high-performance textiles such as various types of sports clothing and various safety products (e.g., bulletproof clothing, protective clothing and protective gloves); various rope products such as tag ropes, mooring ropes, sailboat ropes, and construction ropes; various braid products such as fishing lines and blind cables; net products such as fishing nets and safety nets; reinforcement materials or various unwoven fabrics such as chemical filters and battery separators; screen materials such as tents; prepregs for sports (e.g., helmets and ski plates) or for speaker cones; and reinforcing fibers for composites for the reinforcement of concrete.

The invention claimed is:

1. An ultra-high molecular weight polyethylene powder having a viscosity-average molecular weight of $10 \times 10^4$ or higher and $1000 \times 10^4$ or lower, wherein
a temperature range in which a torque value reaches ½ of the maximum torque value is 150° C. or higher and 170° C. or lower in torque value measurement under the following <kneading condition>:
<kneading condition>
raw material:
a mixture containing 5 parts by mass of the ultra-high molecular weight polyethylene powder and 95 parts by mass of liquid paraffin based on 100 parts by mass in total of the ultra-high molecular weight polyethylene powder and the liquid paraffin, torque value measurement condition:
the raw material is kneaded at 130° C. for 30 minutes and then further kneaded at 240° C. for 15 minutes;
a heating rate from 130° C. to 240° C. is set to 22° C./min;
a rotation number of a screw is set to 50 rpm; and
the measurement is performed under a nitrogen atmosphere.

2. The ultra-high molecular weight polyethylene powder according to claim 1, wherein the ultra-high molecular weight polyethylene powder has
D10/D50 of 0.40 or more,
D90/D50 of 2.0 or less, and
D50 of 80 μm or larger and 250 μm or smaller.

3. The ultra-high molecular weight polyethylene powder according to claim 1, wherein a content of an ultra-high molecular weight polyethylene powder particle of 53 μm or smaller is 5% by mass or more and 45% by mass or less.

4. The ultra-high molecular weight polyethylene powder according to claim 1, wherein the ultra-high molecular weight polyethylene powder has Tm1 of 130° C. or higher and 150° C. or lower in differential scanning calorimeter (DSC) measurement.

5. The ultra-high molecular weight polyethylene powder according to claim 1, wherein an amount of silicon remaining in the ultra-high molecular weight polyethylene powder is 1 ppm or more.

6. An ultra-high molecular weight polyethylene fiber prepared by spinning an ultra-high molecular weight polyethylene powder according to claim 1.

* * * * *